(12) United States Patent
Ben-Yehuda et al.

(10) Patent No.: US 8,943,260 B2
(45) Date of Patent: Jan. 27, 2015

(54) DYNAMIC MEMORY MANAGEMENT IN A VIRTUALIZED COMPUTING ENVIRONMENT

(75) Inventors: Shmuel Ben-Yehuda, Haifa (IL); Dilma Menezes Da Silva, White Plains, NY (US); Abel Gordon, Haifa (IL); Michael R. Hines, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 13/046,745

(22) Filed: Mar. 13, 2011

(65) Prior Publication Data
US 2012/0233435 A1 Sep. 13, 2012

(51) Int. Cl.
G06F 12/00 (2006.01)
G06F 9/50 (2006.01)

(52) U.S. Cl.
CPC ............ *G06F 9/5022* (2013.01); *G06F 9/5077* (2013.01)
USPC ................................ 711/6; 711/170; 718/104

(58) Field of Classification Search
USPC ............................................................ 711/6
See application file for complete search history.

(56) References Cited

U.S. PATENT DOCUMENTS 7,433,951 B1 * 10/2008 Waldspurger ................. 709/226
7,716,446 B1 * 5/2010 Chen et al. .................... 711/170
2009/0025006 A1 * 1/2009 Waldspurger ................. 718/104
2009/0254596 A1 * 10/2009 Dussud et al. ................ 707/206
2010/0241785 A1 9/2010 Chen et al.
2010/0274947 A1 * 10/2010 Ohta et al. ........................ 711/6
2011/0320682 A1 * 12/2011 McDougall et al. .............. 711/6

OTHER PUBLICATIONS

Carl A. Waldspurger, "Memory resource management in VMware ESX server", 5th Symposium on Operating Systems Design and Implementation (2002). URL: http://delivery.acm.org/10.1145/850000/844146/p181-waldspurger.pdf?key1=844146&key2=8256343921&coll=DL&dl=ACM&CFID=3579568&CFTOKEN=87419603.

* cited by examiner

*Primary Examiner* — Kaushikkumar Patel
(74) *Attorney, Agent, or Firm* — Trentice A. Bolar

(57) ABSTRACT

A memory management method in a virtualized computing environment is provided, in which a hypervisor implements at least a virtual machine (VM) over a host machine, wherein a guest operating system (OS) is executed over the VM and an application supporting memory management capabilities is executed over the guest OS. The method comprises invoking a first memory manager (java balloon) implemented by the application to deallocate memory allocated to the application for use by the hypervisor, in response to a request submitted by the hypervisor; and invoking a second memory manager (guest balloon) implemented over the guest operating system to deallocate memory allocated to the guest OS, in response to a request submitted by the hypervisor.

24 Claims, 6 Drawing Sheets

DYNAMIC MEMORY MANAGEMENT IN A VIRTUALIZED COMPUTING ENVIRONMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to dynamic memory allocation and, more particularly, to a system and method for controlling the size of allocated memory associated with a program executed in a virtualized computing environment.

BACKGROUND

Dynamic memory allocation refers to the allocation of memory to a computer program during the runtime of that program. The dynamic allocation helps efficiently distribute limited memory resources to several programs that are executing at the same time. Memory may be allocated among said programs from a pool of unused memory managed by a data structure called the heap or other suitable memory management data structure. When a program no longer needs the memory, the allocated memory is released back (i.e., is deallocated) to the heap.

Dynamic memory allocation in a virtualized environment is generally more challenging because the memory resources are shared among several virtualized components such as a hypervisor, one or more virtual machines (VMs), and the corresponding guest software. A hypervisor runs on a host machine to support the allocation of resources to the VMs. A VM allows for guest software to be executed on the host machine without the guest software being aware of the underlying hardware specification of the host machine. In other words, a VM provides a platform independent (i.e., a virtual) execution environment for the guest software.

In a virtualized environment, the memory space for the guest software is divided into blocks, typically 4 KB, called pages. The physical memory (i.e., the host machine's memory) is also divided into blocks, also typically 4 KB. When the host's memory is full, the data for virtual pages that are not present in host's memory are stored on disk. Therefore, three memory layers may be present: guest virtual memory, guest physical memory, and host physical memory. When the memory is being dynamically allocated, each guest consumes memory based on its configured size, plus additional overhead memory for virtualization.

The guests sometimes use more memory than the host has physically available. For example, three guests with 2 GB memory allocated to each may run on a host with 4 GB of physical memory. In that case, the memory is said to be overcommitted for about 2 GB. To improve memory utilization, the hypervisor may deallocated memory from idle guest software and allocate the memory to guest software that need more memory.

When the total amount of memory in the host becomes low, none of the guest software may free guest physical memory because the guest OS cannot detect the host's memory shortage. Particularly, Java Virtual Machines (JVMs), which are platform-independent execution environments for converting and executing Java bytecode, lack an automatic mechanism to externally control the heap size during run-time. In a JVM, minimum and maximum values for the heap size are defined when the JVM starts. During run-time, the heap size is usually increased and may not be reduced by the JVM.

In the above scenario, the OS assigns a portion of the physical memory to the JVM as it does to any guest process. If the JVM consumes more memory than the physical memory available, the OS starts swapping user-space memory to disk or similar external devices. This process significantly reduces the performance of the JVM and the overall system. In some implementations, when multiple VMs run over a single host and share a fixed amount of physical memory, the hypervisor may over-commit memory to reduce costs, by giving the VMs the illusion that they have more memory than is actually available on the physical machine.

Due to the fact that there is no cooperation between the JVM and the hypervisor, when a VM is running a JVM inside and the JVM's heap size is larger than the physical memory assigned by the hypervisor, swapping will occur at the host or the guest level, also reducing the performance of the VM and the overall host. There is known trade-off between the JVM performance and the heap size. Even if reducing the heap size decreases the JVM performance, this performance degradation is an order of magnitude less than the performance degradation caused when the heap size is larger than the physical memory available.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a memory management method in a virtualized computing environment is provided, in which a hypervisor implements at least a virtual machine (VM) over a host machine, wherein a guest operating system (OS) is executed over the VM and an application supporting memory management capabilities is executed over the guest OS. The method comprises invoking a first memory manager (java balloon) implemented by the application to deallocate memory allocated to the application for use by the hypervisor, in response to a request submitted by the hypervisor; and invoking a second memory manager (guest balloon) implemented over the guest operating system to deallocate memory allocated to the guest OS, in response to a request submitted by the hypervisor.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
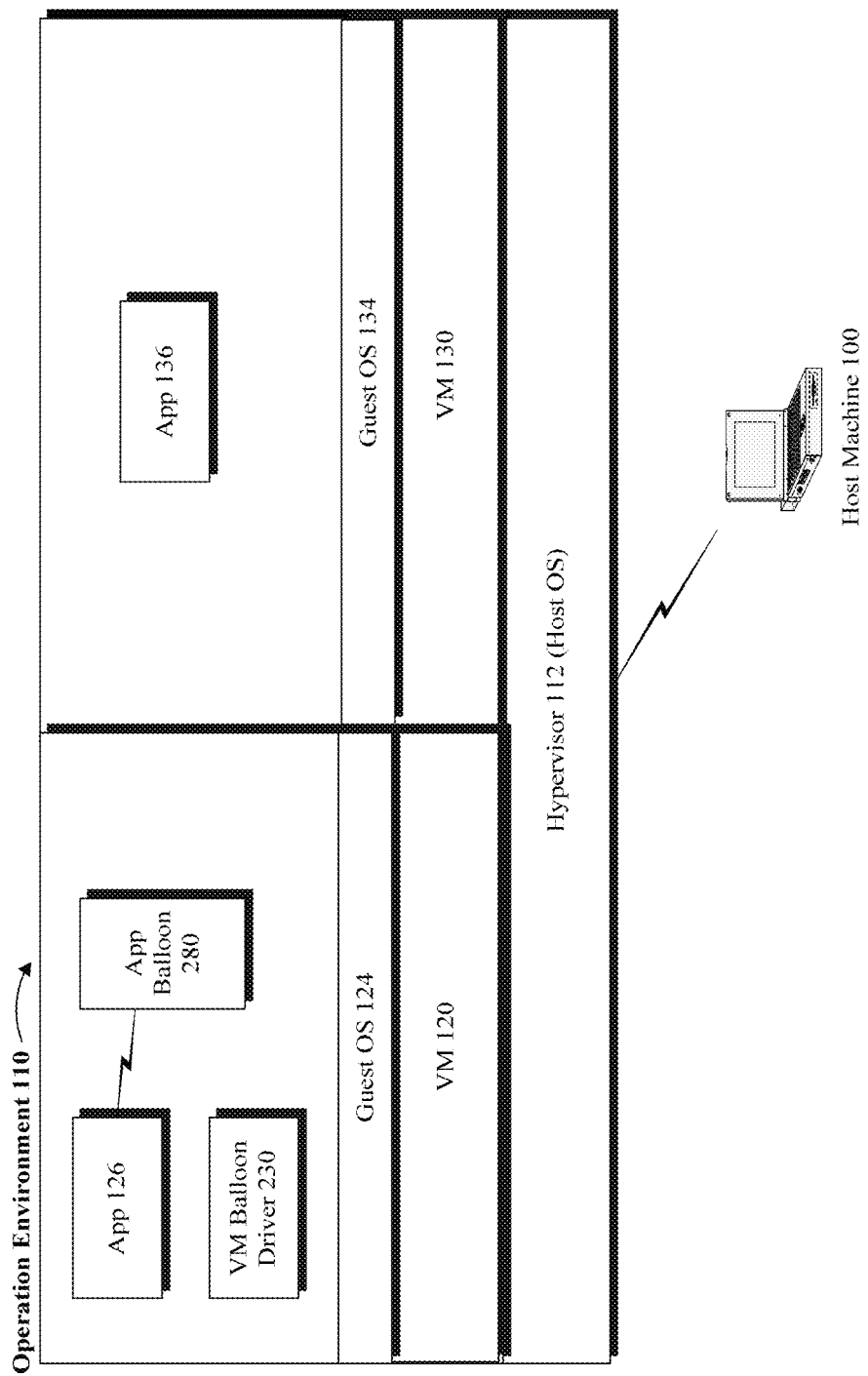
FIG. 1 illustrates an exemplary operational environment in accordance with one or more embodiments, wherein a plurality of VMs are executed in a virtualized computing environment.

Referring to FIG. 1, in one embodiment, an exemplary runtime computing environment is illustrated. As shown, an operation environment 110 comprises a hypervisor 112 running on a host machine 100. The hypervisor 112 basically acts as an operating system (OS) for the host machine 100 and provides a runtime environment for one or more virtual machines (VMs). Thus, operation environment 110 supports a virtualized system in which example VMs 120 and 130 may be executed on top of hypervisor 112.

Figure 2:
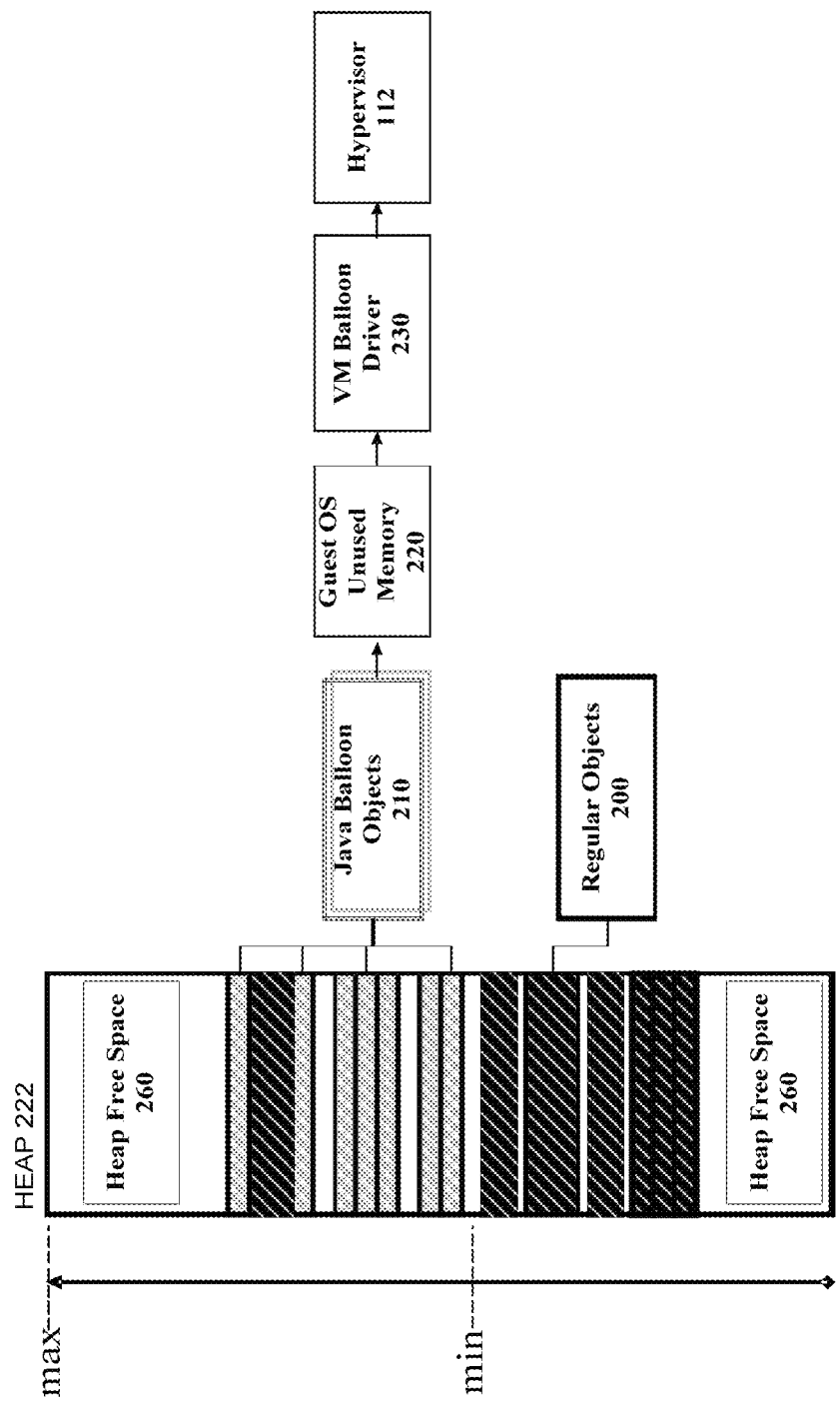
FIG. 2 is an exemplary block diagram of a data structure utilized to dynamically allocate memory in a virtualized computing environment, in accordance with an exemplary embodiment that runs a JVM inside a guest.

VMs 120 and 130 may host one or more guest software (e.g., Apps 126, 136) that run on top of guest OS 124 or 134. As shown in FIG. 2, memory may be allocated among the one or more guest applications 126, 136 and the hypervisor 112. The hypervisor 112 assigns memory to VMs 120 and 130 from free memory space (not shown) available on the host machine 100. The guest OS 124 allocates some of the memory to a memory management data structure for application 126. Some of the memory in said memory management data structure may be reserved, as provided in further detail below, by way of one or more advance memory reservation (i.e., application balloon 280) mechanisms.

Referring to FIG. 2, in one exemplary embodiment, application 126 may be a Java Virtual Machine (JVM) and the memory management data structure may be implemented as heap 222 which includes a pool of memory available in a heap free space 260. A process herein referred to as 'guest ballooning' may be used to make a guest OS 124 aware of the low memory status of a host machine 100 (i.e., the need of the hypervisor 112 for additional memory). In one embodiment, the hypervisor 112 communicates with the VM balloon driver 230 (i.e., the guest balloon driver) or application balloon 280 or both when the hypervisor 112 needs to reclaim memory. Depending on implementation, the hypervisor 112 may set a target balloon size for the VM balloon driver 230 to make a guest OS 124 balloon inflate by allocating guest physical pages within the guest OS 124, for example.

In one implementation, the hypervisor 112 inflates the guest OS 124 balloon according to one or more memory management policies (e.g., when the hypervisor 112 is under memory pressure). By inflating the guest balloon, the hypervisor 112 manages the memory allocation to meet the goals of the implemented policies (e.g., transfers the memory pressure from the host machine 100 to the guest OS 124). In response, the VM balloon driver 230 allocates and possibly pins guest physical memory. The guest OS 124 determines if the OS needs to page out guest physical memory to satisfy the VM balloon driver 230 allocation requests.

If the guest has plenty of free guest physical memory, inflating the guest balloon will induce no paging and will not impact guest performance. However, if the guest is already under memory pressure, the guest OS 124 decides which guest physical pages to be paged out to the virtual swap device, in order to satisfy the balloon driver's allocation requests. This guest ballooning mechanism, thus, allows the guest OS 124 to intelligently make the decision about which pages to be paged out without the hypervisor's 112 involvement.

In the cases where the above guest ballooning mechanism is not sufficient to reclaim memory, the hypervisor 112 may be forced to create a separate swap file for the guest OS 124 so that the hypervisor 112 may directly swap out guest physical memory to that swap file, which frees host physical memory for other guests. In one embodiment, a second balloon mechanism (in addition or exclusive of the guest balloon mechanism above) may be utilized to provide for taking or releasing memory from a memory management data structure (e.g., heap 222 in case of JVM) to allocate or deallocate memory to a running guest OS 124.

As an overview, this second ballooning mechanism may be used, in one embodiment, to allocate some of the memory in the heap 222 to balloon objects instantiated by the operating system of a guest (e.g., guest OS 124). In the following, the second ballooning mechanism is disclose by way of example as implemented to apply to a guest OS running over a JVM. We therefore will refer to the balloon objects as java balloon objects 210 (see FIG. 2).

It is noteworthy, however, that the disclosed concepts and mechanisms here may be applied to virtual machines or in virtualized environments other than JVM. Thus, the scope of the claims is not to be construed as narrowly applicable to the embodiments disclosed herein in association with JVM or other exemplary features or mechanism implemented to work within the JVM environment such as heap 222. Nevertheless, for the purpose of consistency we refer to the second balloon mechanism as the java balloon, by way of example. Thus, the concepts disclosed herein are applicable to other applications that are capable of managing memory allocation in a memory management data structure such as heap 222.

Referring back to FIGS. 1 and 2, the purpose of the java balloon objects 210 is to act as a placeholder, so that the JVM or a process hosted by the JVM would not use the memory space allocated to the java balloon objects 210. In this way, if the hypervisor 112 needs additional memory (e.g., to allocate to other VMs or processes running on the host machine 100), the memory space reserved by the java balloon objects 210 may be released to guest OS 124 and ultimately to the hypervisor 112 as provided in further detail below.

In one embodiment, the JVM inflates or deflates the so called java balloon by allocating more or less memory to the java balloon objects 210. Conceptually, the java balloon refers to a portion of the heap 222 that is allocated to the java balloon objects 210 to reserve memory space for the hypervisor 112 or provide for the guest OS 124 unused memory 220. The rest of the heap free space 260 may be made available for regular objects 200 instantiated by the JVM (i.e., application 126) for other purposes.

By way of the java balloon mechanism, the other processes and applications cannot access the memory space allocated to the java balloon objects 210. Further, the guest OS 124 cannot go over its quota when the memory reserved by the java balloon objects 210 is released to the hypervisor 112. In one embodiment, the java balloon objects 210 may be pinned in the JVM so that the java balloon objects 210 are not moved in the heap 222 as the result of a garbage collection process, for example.

In one embodiment, the java balloon acts as a thread inside the JVM user-space process and acquires or releases java balloon objects 210 to change the heap size. As noted earlier, the guest balloon mechanism discussed earlier does not solve the memory over-commit problem for VMs running Java based workloads because the guest OS might fall into heavy swapping when the JVM heap size is larger than the amount of physical memory currently assigned to the VM.

By using the java balloon (e.g., optionally in combination with the guest balloon mechanisms), the hypervisor 112 can control both the amount of physical memory assigned to a guest OS 124 as well as the memory requirements of the app 126 (e.g., the JVM process) running over the guest OS 124. In short, the hypervisor 112 uses the java balloon to keep the JVM heap size below the VM physical memory size. In this manner, java application code or bytecode may remain unchanged when a java balloon is used inside the JVM as provided in further detail below.

Figure 3A:
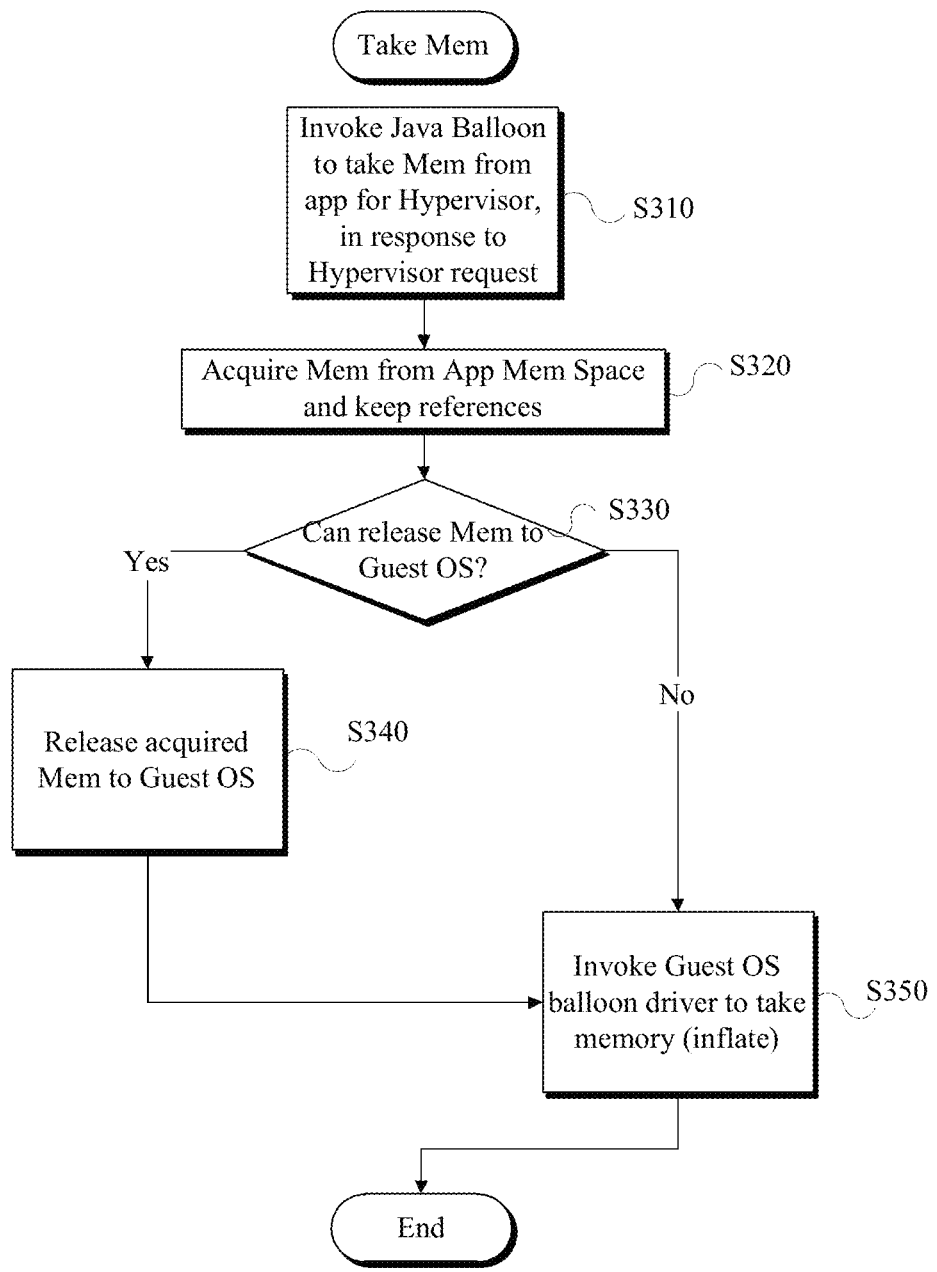
FIGS. 3A and 3B are flow diagrams of exemplary methods for dynamically allocating and deallocating memory, in accordance with one embodiment.

Referring to FIGS. 2 and 3A, the java balloon, in one embodiment, may be implemented by a single or multiple java balloon objects 210 (e.g., primitive byte arrays) occupying space in the heap 222. When hypervisor 112 requests for memory to be taken from an application, the java balloon is invoked (S310). The java balloon is inflated by acquiring memory from the application memory space (e.g., allocating new java balloon objects 210 in the heap) and keeping their references (S320). In one embodiment, using java native interface (JNI), for example, the java balloon objects 210 may be pinned in memory to prevent a garbage collector process from moving them.

A procedure or system call may be utilized to monitor whether the memory allocated to the java balloon objects 210 may be released to the guest OS 124 (S330). In one implementation, the native references (e.g., the virtual addresses) of the objects may be used to advise the guest OS 124 that the memory corresponding to the java balloon objects 210 is no longer needed. For example, using the madvise( ) system call available in Linux, the memory may be returned to the guest OS 124 (S340). The guest OS 124 VM balloon driver 230 may be used to take memory from guest OS 124 by inflating the guest balloon (S350) after the java balloon is inflated according to the above processes (i.e., S320 through S340).

Figure 3B:
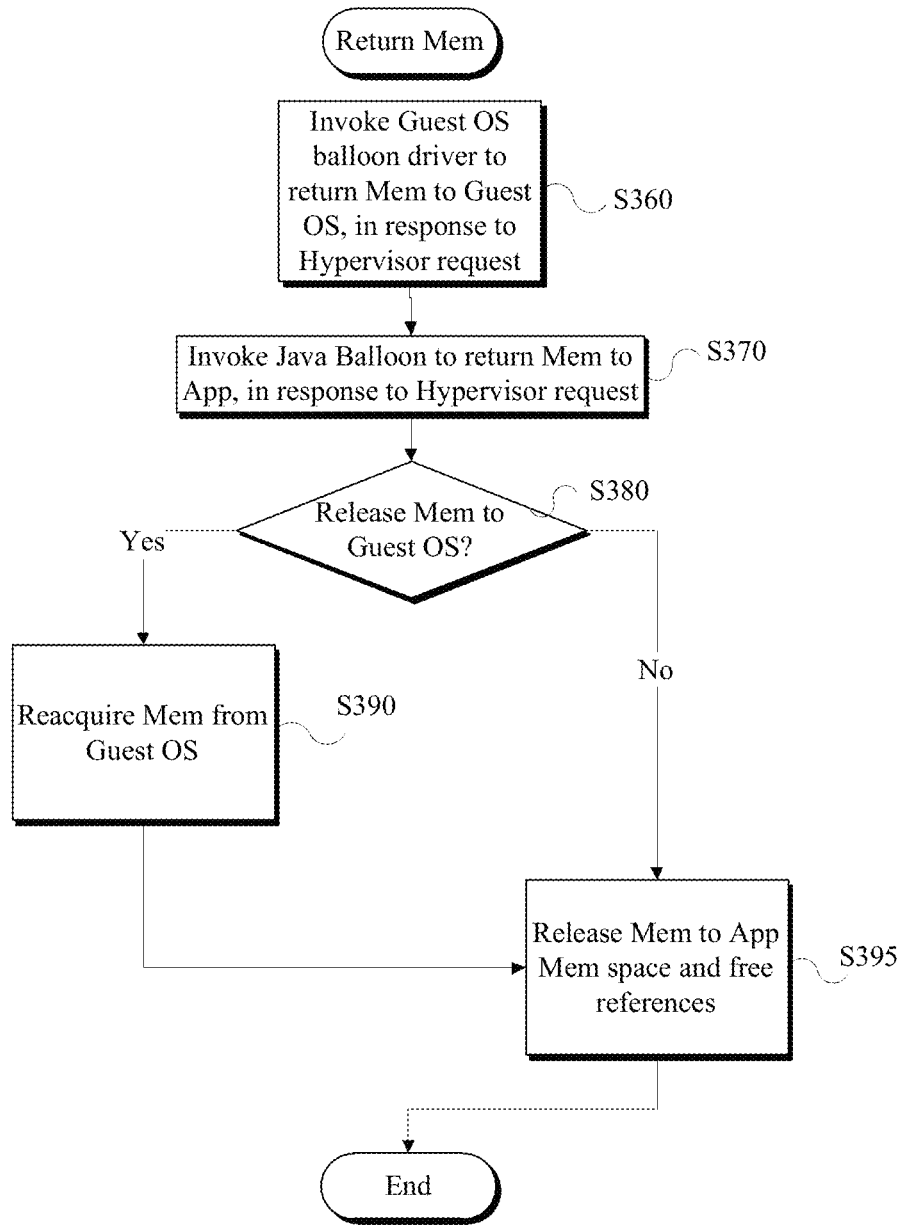

In contrast to FIG. 3A, FIG. 3B illustrates a method according to one embodiment on how to return memory back to the guest OS 124 when the memory is no longer needed by the hypervisor 112. As shown, the guest OS 124 VM balloon driver 230 may be invoked by the hypervisor 112 to deflate the guest balloon (S360) prior to deflating the java balloon as provided in further detail below.

In one embodiment, hypervisor 112 may request for the java balloon to return memory allocated to the java balloon objects 210 back to the application memory space (e.g., heap 222) (S370). The hypervisor 112 invokes the java balloon to deflate and transfer the memory released to guest OS 124 disclosed above to the JVM heap 222. The java balloon checks if memory was released to the guest OS 124 when the java balloon was inflated (S380). If so, the memory allocated to the java balloon objects are acquired from guest OS 124 (S390). The java balloon releases any references to the java balloon objects so they are treated as free space by the guest OS 124 and may be used for other purposes in the application free memory space (S395).

In the following the process associated with inflating and deflating the java balloon is disclosed in further detail, with reference to exemplary embodiments implemented in a JVM with an embedded java balloon over a Linux OS. In such implementation, the application entry point is passed to the JVM as a run-time parameter. The entry point may be changed with a new one that receives the original entry point as a command line parameter. The new entry point starts a daemon thread, responsible for creating the java-balloon with an initial size (can be specified as a command line parameter), and then starts the execution of the original entry point. The daemon thread remains alive for the lifetime of the JVM process and waits for external requests to increase or decrease the java-balloon size. This can be done using TCP sockets or any other process communication mechanism. Each time the daemon thread receives a request, it inflates or deflates the java-balloon accordingly, by releasing or acquiring new objects.

Inflating the java balloon—when the balloon daemon receives a request to inflate the java-balloon, it starts creating new objects till the java-balloon reaches the corresponding size. For example, if the balloon size is 100 MB and the daemon receives a request to inflate it to 300 MB, the daemon creates new objects which occupy 200 MB in the heap and keeps the references. These objects can be, for example, primitive byte arrays. Then, using JNI services, the objects are pinned in memory (e.g. invoking GetPrimitiveArrayCritical). Finally, the corresponding memory is released to the OS, for example, invoking the madvise system call with MADV_DONTNEEDED flag for Linux.

Deflating the java balloon—when the balloon daemon receives a request to deflate the java-balloon, it reclaims the corresponding amount of memory from the OS, for example, invoking the madvise system call with MADV_NORMAL flag for Linux. Then the daemon unpin the corresponding objects, (e.g. invoking ReleasePrimitiveArrayCritical). The references to the corresponding objects are released, while allows the JVM garbage collector find and treat them as free space.

The above details may vary if long-term pinning is not supported by the JVM. For example, if the JVM does not support long-term pinning but supports disabling compaction, the JVM may be started without compaction and the java balloon will not pin objects. If the JVM does not support long-term pinning and does not support disabling compaction, the java balloon will not pin the objects and will also not advise the OS on this objects. After period of time the java balloon objects will be compacted and remain in a constant place in the heap. The OS will then detect that the pages corresponding to the java balloon objects are not being use and will swap them out to disk.

The above methods may be applicable to other non-JVM environments and programs that implement their own memory management, for example, such that (1) the program allows running module/code under the same memory context (e.g., plugins), (2) the program exposes an interface to acquire and release memory, or (3) the program exposes an interface to communicate with external entities. If the above optional conditions does not exist, the balloon mechanism can be used with a build-in autonomous policy to control the balloon size.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
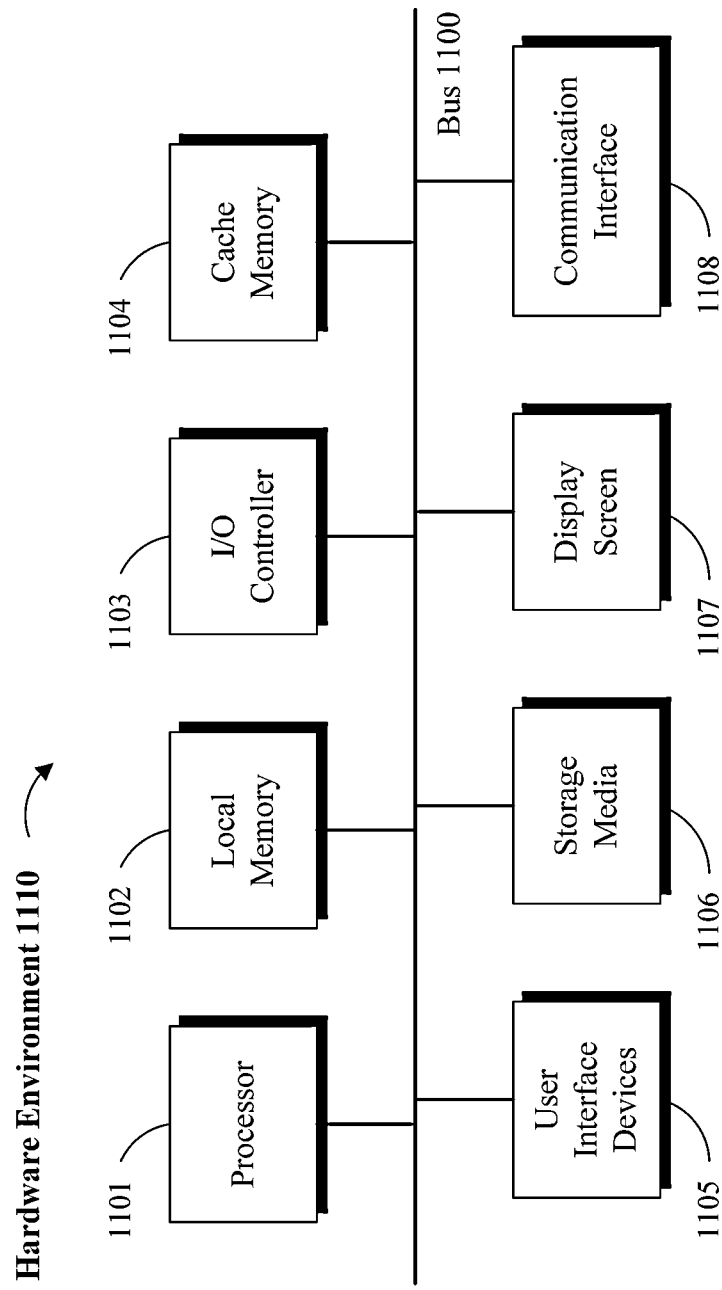
FIGS. 4A and 4B are block diagrams of hardware and software environments in which the disclosed systems and methods may operate, in accordance with one or more embodiments.
Figure 4B:
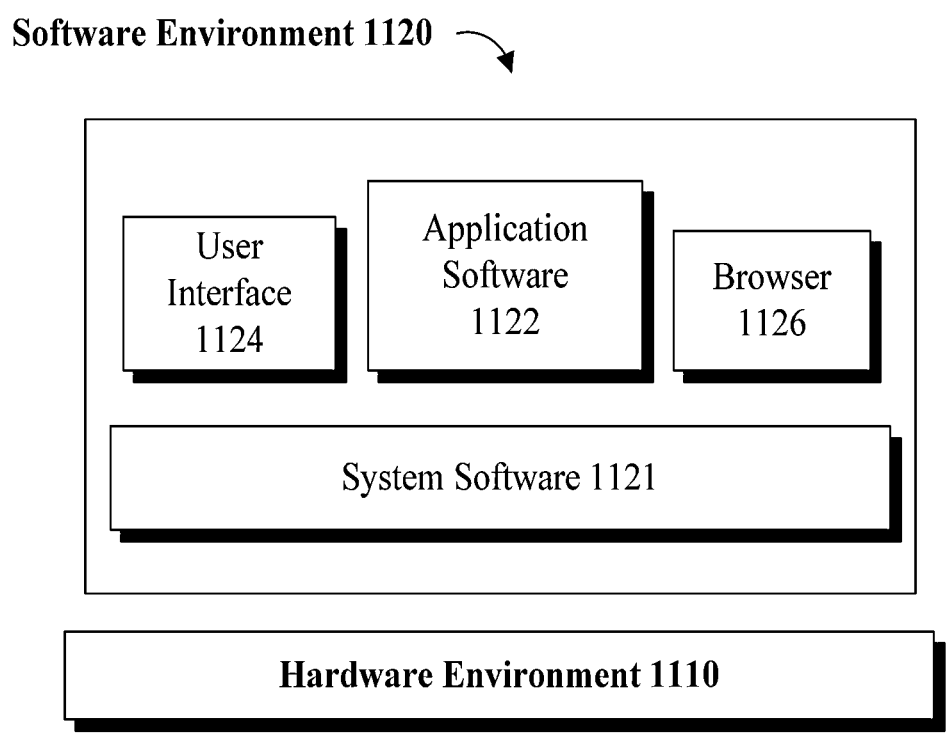

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing.

Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A memory management method in a virtualized computing environment, with a hypervisor implementing at least a virtual machine (VM) over a host machine, wherein a guest operating system (OS) is executed over the VM and an application supporting memory management capabilities is executed over the guest OS, the method comprising:
   invoking a first memory manager (Java balloon) implemented by the application to deallocate memory allocated to a first application running on the guest OS, so that the deallocated memory is reserved for use by the hypervisor such that the hypervisor is enabled to allocate the reserved memory to a second application running on the host machine, by way of a request submitted by the hypervisor to the first memory manager to reserve memory space,
   wherein the memory space is reserved by way of the first memory manager creating one or more balloon objects that are pinned in the memory space,
   wherein the reserved memory space is identified as allocated to the one or more balloon objects so that the reserved memory space is not subject to removal from a memory management data structure utilized by the first memory manager by way of a garbage collection process;
   invoking a second memory manager (guest balloon) implemented over the guest operating system to deallocate memory allocated to the guest OS, in response to a request submitted by the hypervisor to the second memory manager to facilitate deflation of the one or more balloon objects in the reserved memory space by unpinning the one or more balloon objects from the memory space; and
   wherein the first memory manager (java balloon) releases the references to memory allocated to the one or more balloon objects associated with the first memory manager so the associated memory space may be used by the application.

2. The method of claim 1, wherein invoking the first memory manager comprises acquiring memory from memory space assigned to the application.

3. The method of claim 2, wherein invoking the first memory manager further comprises keeping references to the memory acquired from the memory space assigned to the application.

4. The method of claim 3, wherein invoking the first memory manager further comprises monitoring whether memory allocated to a first memory management data structure associated with the first memory manager (Java balloon) may be released to the guest OS.

5. The method of claim 4, further comprising releasing the memory allocated to the first memory management data structure associated with the first memory manager (Java balloon) to the guest OS.

6. The method of claim 4, further comprising invoking the second memory manager (guest balloon) to take memory from the guest OS.

7. The method of claim 1, wherein invoking the second memory manager (guest Balloon) comprises invoking the guest OS to return memory to the application from memory allocated to the first memory manager (Java balloon).

8. The method of claim 7, further comprising monitoring whether memory was released to the guest OS by the first memory manager (java balloon).

9. The method of claim 8, wherein if memory was released to the guest OS by the first memory manager (java balloon), the memory release is reacquired from guest OS.

10. A memory management system in a virtualized computing environment, the memory management system comprising:
    a hypervisor implementing at least a virtual machine (VM) over a host machine having one or more processors on which the VM is executed, wherein a guest operating system (OS) is executed over the VM and an application supporting memory management capabilities is executed over the guest OS;
    a logic unit for invoking a first memory manager implemented by the application to deallocate memory allocated to a first application running on the guest OS, so that the deallocated memory is reserved for use by the hypervisor such that the hypervisor is enabled to allocate the reserved memory to a second application running on the host machine, by way of a request submitted by the hypervisor to the first memory manager to reserve memory space,
    wherein the memory space is reserved by way of the first memory manager creating one or more balloon objects that are pinned in the memory space,
    wherein the reserved memory space is identified as allocated to one or more balloon objects so that the reserved memory space is not subject to removal from a memory management data structure utilized by the first memory manager by way of a garbage collection process;
    a logic unit for invoking a second memory manager implemented over the guest operating system to deallocate memory allocated to the guest OS, in response to a request submitted by the hypervisor to the second memory manager to facilitate deflation of the one or more balloon objects in the reserved memory space by unpinning the one or more balloon objects from the memory space; and
    wherein the first memory manager (java balloon) releases the references to memory allocated to the one or more balloon objects associated with the first memory manager so the associated memory space may be used by the application.

11. The system of claim 10, wherein invoking the first memory manager comprises acquiring memory from memory space assigned to the application.

12. The system of claim 11, wherein invoking the first memory manager further comprises keeping references to the memory acquired from the memory space assigned to the application.

13. The system of claim 12, wherein invoking the first memory manager further comprises monitoring whether memory allocated to a first memory management data structure associated with the first memory manager may be released to the guest OS.

14. The system of claim 13, further comprising releasing the memory allocated to the first memory management data structure associated with the first memory manager to the guest OS.

15. The system of claim 13, further comprising invoking the second memory manager to take memory from the guest OS.

16. The system of claim 10, wherein invoking the second memory manager comprises invoking the guest OS to return memory to the application from memory allocated to the first memory manager.

17. The system of claim 16, further comprising monitoring whether memory was released to the guest OS by the first memory manager (java balloon).

18. The system of claim 17, wherein if memory was released to the guest OS by the first memory manager, the memory release is reacquired from guest OS.

19. The system of claim 18 further comprising: the first memory manager releasing the references to memory allocated to objects associated with the first memory manager so the associated memory space may be used by the application.

20. A computer program product comprising a non-transitory computer readable storage medium having a computer readable program, wherein a memory management system in a virtualized computing environment is provided in which a hypervisor implements at least a virtual machine (VM) over a host machine, wherein a guest operating system (OS) is executed over the VM and an application supporting memory management capabilities is executed over the guest OS, and wherein the computer readable program when executed on a computer causes the computer to:

invoke a first memory manager implemented by the application to deallocate memory allocated to a first application running on the guest OS, so that the deallocated memory is reserved for use by the hypervisor such that the hypervisor is enabled to allocate the reserved memory to a second application running on the host machine, by way of a request submitted by the hypervisor to the first memory manager to reserve memory space, wherein the memory space is reserved by way of the first memory manager creating one or more balloon objects that are pinned in the memory space, wherein the reserved memory space is identified as allocated to one or more balloon objects so that the reserved memory space is not subject to removal from a memory management data structure utilized by the first memory manager by way of a garbage collection process;

invoke a second memory manager implemented over the guest operating system to deallocate memory allocated to the guest OS, in response to a request submitted by the hypervisor to the second memory manager to facilitate deflation of the one or more balloon objects in the reserved memory space by unpinning the one or more balloon objects from the memory space; and wherein the first memory manager (java balloon) releases the references to memory allocated to the one or more balloon objects associated with the first memory manager so the associated memory space may be used by the application.

21. The computer program product of claim 20, wherein invoking the first memory manager comprises acquiring memory from memory space assigned to the application.

22. The computer program product of claim 21, wherein invoking the first memory manager further comprises keeping references to the memory acquired from the memory space assigned to the application.

23. The computer program product of claim 22, wherein invoking the first memory manager further comprises monitoring whether memory allocated to a first memory management data structure associated with the first memory manager may be released to the guest OS.

24. The computer program product of claim 23, wherein the memory allocated to the first memory management data structure associated with the first memory manager to the guest OS is released.

* * * * *